US012451009B2

(12) United States Patent
Floerchinger (10) Patent No.: US 12,451,009 B2
(45) Date of Patent: Oct. 21, 2025

(54) METHOD AND SYSTEM FOR COORDINATING DRIVERLESS TRANSPORT VEHICLES (71) Applicant: Bayerische Motoren Werke Aktiengesellschaft, Munich (DE)

(72) Inventor: Georg Floerchinger, Sinzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 167 days.

(21) Appl. No.: 18/265,309

(22) PCT Filed: Nov. 10, 2021

(86) PCT No.: PCT/EP2021/081250
§ 371 (c)(1),
(2) Date: Jun. 5, 2023

(87) PCT Pub. No.: WO2022/128265
PCT Pub. Date: Jun. 23, 2022

(65) Prior Publication Data
US 2024/0038067 A1 Feb. 1, 2024

(30) Foreign Application Priority Data

Dec. 16, 2020 (DE) .................... 10 2020 133 674.8

(51) Int. Cl.
G08G 1/0967 (2006.01)
B60W 60/00 (2020.01)
G08G 1/01 (2006.01)

(52) U.S. Cl.
CPC ... G08G 1/096725 (2013.01); B60W 60/0027 (2020.02); G08G 1/0112 (2013.01);
(Continued)

(58) Field of Classification Search
CPC .......... G08G 1/096725; G08G 1/0112; G08G 1/0145; G08G 1/096775; B60W 60/0027; B60W 2556/45
(Continued)

(56) References Cited

U.S. PATENT DOCUMENTS 6,393,362 B1 * 5/2002 Burns ................. G05D 1/0278
701/119
7,418,346 B2 * 8/2008 Breed .................... G08G 1/164
701/117

(Continued)

FOREIGN PATENT DOCUMENTS

CN 103383567 A 11/2013
CN 103492968 A 1/2014
(Continued)

OTHER PUBLICATIONS

International Search Report (PCT/ISA/210) issued in PCT Application No. PCT/EP2021/081250 dated Feb. 7, 2022 with English translation (5 pages).
(Continued)

Primary Examiner — Luis A Martinez Borrero
(74) Attorney, Agent, or Firm — Crowell & Moring LLP (57) ABSTRACT The invention relates to a method for coordinating driverless transport vehicles (1, 2). A first trajectory (12) calculated by a first of the transport vehicles (1, 2) and a second trajectory (13), calculated by a second of the transport vehicles (1, 2), of the ☐ second transport vehicle (2) are received by means of a central computing device (8). A space requirement (10) of the first transport vehicle (1) along the first trajectory (12) and a second space requirement (11) of the second transport vehicle (2) along the second trajectory (13) are determined by means of the computing device (8). If it is determined by means of the computing device (8) that the S space requirements (10, 11) will at least partially overlap each other, the
(Continued)

first or second transport vehicle (1, 2) is selected by means of □ the computing device (8), and a signal is transmitted to the selected transport vehicle (1, 2). The signal prompts the selected transport vehicle (1, 2) to change its movement along its trajectory (12, 13) and/or its trajectory (12, 13).

8 Claims, 6 Drawing Sheets

(52) U.S. Cl.
CPC ..... *G08G 1/0145* (2013.01); *G08G 1/096775* (2013.01); *B60W 2556/45* (2020.02)

(58) Field of Classification Search
USPC ........................................................ 701/117
See application file for complete search history.

(56) References Cited

U.S. PATENT DOCUMENTS

| | | | | |
|---|---|---|---|---|
| 7,663,505 | B2* | 2/2010 | Publicover | G08G 1/0965 340/936 |
| 7,969,324 | B2* | 6/2011 | Chevion | G08G 1/164 340/916 |
| 7,979,173 | B2* | 7/2011 | Breed | G08G 1/163 701/23 |
| 8,346,468 | B2* | 1/2013 | Emanuel | G05D 1/0289 340/901 |
| 8,352,112 | B2* | 1/2013 | Mudalige | G08G 1/22 342/458 |
| 8,577,585 | B2* | 11/2013 | Atmur | G06Q 10/06 318/135 |
| 8,793,036 | B2* | 7/2014 | Koon | G05D 1/0297 701/1 |
| 9,568,915 | B1 | 2/2017 | Berntorp et al. | |
| 10,600,666 | B2* | 3/2020 | Niiyama | H01L 21/67733 |
| 11,747,806 | B1* | 9/2023 | Wootton | G08G 1/161 701/28 |
| 2002/0143461 | A1* | 10/2002 | Burns | G05D 1/0297 701/23 |
| 2008/0161986 | A1* | 7/2008 | Breed | G01S 19/51 701/23 |
| 2009/0317217 | A1* | 12/2009 | Nishimura | B66F 9/063 414/222.03 |
| 2011/0093134 | A1* | 4/2011 | Emanuel | G05D 1/0297 701/2 |
| 2013/0325210 | A1 | 12/2013 | Palm | |
| 2016/0161947 | A1* | 6/2016 | Liao | G08G 1/202 701/2 |
| 2017/0017236 | A1* | 1/2017 | Song | G08G 1/165 |
| 2017/0344009 | A1* | 11/2017 | Wernersbach | H04B 7/04 |
| 2017/0372150 | A1 | 12/2017 | Mayser | |
| 2018/0059682 | A1* | 3/2018 | Thode | G05D 1/0274 |
| 2018/0321689 | A1 | 11/2018 | Lehmann et al. | |
| 2018/0350238 | A1 | 12/2018 | Atlinger et al. | |
| 2019/0243371 | A1* | 8/2019 | Nister | B60W 30/095 |
| 2019/0250622 | A1 | 8/2019 | Nister et al. | |
| 2019/0302800 | A1 | 10/2019 | Martens et al. | |
| 2020/0050214 | A1 | 2/2020 | Goehl et al. | |
| 2020/0242922 | A1* | 7/2020 | Dulberg | G08G 1/166 |
| 2020/0310446 | A1* | 10/2020 | Zhu | G05D 1/0217 |
| 2021/0020045 | A1* | 1/2021 | Huang | G05D 1/692 |
| 2021/0080976 | A1* | 3/2021 | Tadano | G05B 19/418 |
| 2021/0090433 | A1* | 3/2021 | Van Egmond | G08G 1/0145 |
| 2021/0200212 | A1* | 7/2021 | Urtasun | G05D 1/0214 |
| 2021/0229656 | A1* | 7/2021 | Dax | G08G 1/096811 |
| 2021/0354729 | A1* | 11/2021 | Ng | B60W 30/0956 |
| 2021/0380099 | A1* | 12/2021 | Lee | G08G 1/0141 |
| 2022/0048503 | A1* | 2/2022 | Khandelwal | B60W 30/0956 |
| 2022/0084405 | A1* | 3/2022 | Zhang | G08G 1/096775 |
| 2022/0135029 | A1* | 5/2022 | Poubel Orenstein | B60W 30/0953 701/301 |
| 2022/0332508 | A1* | 10/2022 | Winkler | B65G 1/1378 |
| 2022/0398927 | A1 | 12/2022 | Grotendorst et al. | |
| 2023/0159049 | A1* | 5/2023 | Schwaiger | B60W 30/182 701/23 |
| 2024/0053754 | A1* | 2/2024 | Miura | G05D 1/0212 |

FOREIGN PATENT DOCUMENTS

| | | |
|---|---|---|
| CN | 107107909 A | 8/2017 |
| CN | 108351648 A | 7/2018 |
| CN | 109416886 A | 3/2019 |
| CN | 110268457 A | 9/2019 |
| CN | 110298122 A | 10/2019 |
| CN | 110910646 A | 3/2020 |
| DE | 10 2015 007 531 B3 | 9/2016 |
| DE | 10 2017 202 065 A1 | 8/2018 |
| DE | 11 2017 000 787 T5 | 10/2018 |
| DE | 10 2017 011 694 A1 | 6/2019 |
| DE | 11 2019 000 279 T5 | 8/2020 |
| DE | 10 2019 216 380 A1 | 4/2021 |
| EP | 2 911 926 B1 | 9/2016 |
| EP | 3 439 265 A1 | 2/2019 |
| WO | WO 2018/145951 A1 | 8/2018 |

OTHER PUBLICATIONS

German-language Written Opinion (PCT/ISA/237) issued in PCT Application No. PCT/EP2021/081250 dated Feb. 7, 2022 (7 pages).
German-language Search Report issued in German Application No. 10 2020 133 674.8 dated Jul. 22, 2021 with partial English translation (12 pages).
Draganjac, I. et al., "Decentralized Control of Multi-AGV Systems in Autonomous Warehousing Applications", IEEE Transactions on Automation Science and Engineering, Oct. 2016, pp. 1433-1447, vol. 13, No. 4, New York, NY, US, XP011624948 (15 pages).
English translation of Chinese-language Office Action issued in Chinese Application No. 202180076800.X dated May 16, 2025 (10 pages).
Cover Page of EP 3 580 737 A1 published Dec. 18, 2019 (1 page).

* cited by examiner

METHOD AND SYSTEM FOR COORDINATING DRIVERLESS TRANSPORT VEHICLES

This application is a 371 of International Application No. PCT/EP2021/081250, filed Nov. 10, 2021, which claims priority to German Patent Application No. DE 10 2020 133 674.8, filed Dec. 16, 2020, the disclosures of all of which are incorporated by reference herein.

BACKGROUND AND SUMMARY OF THE INVENTION

The invention relates to a method and system for coordinating driverless transport vehicles, in particular respective journeys of the driverless transport vehicles.

EP 2 911 926 B1 discloses a method for coordinating the operation of motor vehicles that drive in fully automated mode. A known method for controlling a movement of a vehicle can be derived from DE 11 2017 000 787 T5. A method for controlling autonomous vehicles by means of reliable arrival times is known from DE 11 2019 000 279 T5. Moreover, DE 10 2015 007 531 B3 discloses a method for controlling traffic in a car park environment.

Furthermore, driverless transport vehicles are well known from the general prior art. Driverless transport vehicles are used, for example, in the context of product manufacturing such as, for example, motor vehicles, so as to transport goods to be conveyed, i.e., components for manufacturing the products, for example.

It is an object of the present invention to achieve a method and a system for coordinating driverless transport vehicles such that a particularly advantageous traffic flow of the driverless transport vehicles can be implemented.

This object is achieved according to the invention by a method and a system having the features of the independent claims. Advantageous design embodiments of the invention are the subject matter of the dependent claims.

A first aspect of the invention relates to a method for coordinating in particular floor-bound driverless transport vehicles (or AGV—automated guided vehicle). The method is used in particular for coordinating respective journeys of the driverless transport vehicles. Used in the method is a central electronic computing installation which is also referred to as a central control installation or central traffic control. When mention is made hereunder of the electronic computing installation, unless otherwise stated this is to be understood to mean the central electronic computing installation, i.e., the central traffic control. Steps of the method will be described hereunder, wherein ordinal numbers are used for addressing the steps. The ordinal numbers, or the use of the latter, do/does not necessarily imply a corresponding sequence of the steps, but the ordinal numbers are firstly used in particular to unequivocally address and differentiate the steps.

In a first step of the method, a first trajectory, computed by a first of the driverless transport vehicles per se, of the first driverless transport vehicle is received by means of the electronic computing installation. In other words, the electronic computing installation receives the first trajectory of the first driverless transport vehicle, wherein the first driverless transport vehicle per se computes the first trajectory. To this end, the first driverless transport vehicle comprises, for example, a dedicated first mobile electronic computing installation by means of which the first driverless transport vehicle computes the first trajectory. When the first driverless transport vehicle travels along the first trajectory, the first mobile computing installation of the first driverless transport vehicle is thus moved relative to the central electronic computing installation.

In a second step of the method, a second trajectory, computed by a second of the driverless transport vehicles per se, of the second driverless transport vehicle is received by means of the central electronic computing installation. In other words, it is provided in the second step of the method that the central electronic computing installation receives the second trajectory of the second driverless transport vehicle, wherein the second driverless transport vehicle per se computes the second trajectory. To this end, the second driverless transport vehicle comprises, for example, a dedicated second mobile electronic computing installation by means of which the second driverless transport vehicle per se computes the second trajectory. When the second driverless transport vehicle travels along the second trajectory, the second mobile electronic computing installation thus moves relative to the central electronic computing installation. The mobile electronic computing installations are thus separate, individual computing installations which are also provided additionally to the central electronic computing installation and are configured separately from the central electronic computing installation. In this way, the respective mobile electronic computing installation is external in terms of the respective other mobile electronic computing installation and in terms of the central electronic computing installation, and is consequently an external component. The central electronic computing installation preferably receives the respective trajectory wirelessly and thereby via radio, for example. For example, it is provided that the respective driverless transport vehicle provides the respective trajectory in particular wirelessly, in particular via radio, wherein the central electronic computing installation receives the respective provided trajectory.

The respective driverless transport vehicle is preferably a floor-bound driverless transport vehicle which travels along the respective trajectory and thereby along a floor, for example, i.e. travels on a floor. As opposed to conventional driverless transport vehicles however, the respective driverless transport vehicle according to the invention is in principle freely movable in space, or freely movable along the floor, respectively. This means that, as opposed to conventional solutions, the respective driverless transport vehicle is not assigned for instance a fixedly pre-defined, virtually or physically present track, roadway, movement path or the like, as is the case with a rail or block control system, but the respective driverless transport vehicle per se computes the respective trajectory thereof, in particular by means of the respective mobile electronic computing installation, and/or dynamically, i.e. as a function of potentially arising unforeseen situations. Again in other words, the respective driverless transport vehicle is not track-bound but at least substantially freely movable.

In a third step of the method, a first space requirement of the first driverless transport vehicle along the first trajectory is ascertained by means of the central electronic computing installation. Moreover, in the third step of the method, a second space requirement of the second driverless transport vehicle along the second trajectory is ascertained. Space requirement can in particular be understood to mean the following: for example, a first region along the first trajectory for the first driverless transport vehicle is ascertained, wherein the first driverless transport vehicle on its way along the first trajectory moves through the first region or would move through the latter, for example, the first driverless transport vehicle consequently occupying or potentially occupying at least the first region if the first driverless transport vehicle travels or would travel along the first trajectory. The same applies in an analogous manner to the second driverless transport vehicle: for example, a second region along the second trajectory for the second driverless transport vehicle is computed in particular by means of the electronic computing installation, wherein the second driverless transport vehicle moves through the second region or would move through the latter if the second driverless transport vehicle travels or would travel along the second trajectory. In other words, the second driverless transport vehicle occupies or would occupy the second region if it travels or would travel along the second trajectory. In this way, the respective region can be an envelope region within which lie all points of the respective driverless transport vehicle on the path of the latter along the respective associated directory, for example. In this way, the respective region can be considered to be a tubular driveway, for example, through which the respective driverless transport vehicle travels or would travel if it travels or would travel along its respective trajectory.

In a fourth step of the method, it is ascertained by means of the central electronic computing installation that the space requirements, that is to say the regions described above, at least partially overlap one another. In this case, i.e. when it is ascertained by means of the central electronic computing installation that the space requirements, that is to say the regions described above or tubular driveways, at least partially overlap one another, i.e. intersect or at least partially lie in one another, in the fourth step of the method the first driverless transport vehicle or the second driverless transport vehicle is selected by means of the central electronic computing installation by way of at least one criterion. In other words, it is provided in the fourth step that one driverless transport vehicle is selected from the first driverless transport vehicle and the second driverless transport vehicle by way of the criterion mentioned. For example, in the fourth step of the method, the first or the second driverless transport vehicle is selected if the at least one criterion is met. Moreover, it is provided in the fourth step of the method that by means of the central electronic computing installation at least one, in particular electrical, signal is transmitted, in particular wirelessly, to the selected driverless transport vehicle, wherein the selected driverless transport vehicle receives the signal in particular wirelessly, for example. By means of the signal, the selected driverless transport vehicle is initiated to change its movement along its trajectory and/or to change its trajectory. In other words, for example, the selected driverless transport vehicle initially travels, in particular along its trajectory, in particular at a speed different from 0, such that the speed has a first value different from 0, such that the selected driverless transport vehicle initially carries out a movement along its trajectory. The movement of the selected driverless transport vehicle also comprises, for example, the speed, also referred to as the travel speed, at which the selected driverless transport vehicle initially travels along its trajectory. The variation of the movement in this way also comprises, for example, that the selected driverless transport vehicle changes its speed as a function of the received signal, in particular from the first value, different from 0, to a second value which is different from the first value and is different from 0 or else is 0. Alternatively or additionally, it is conceivable that the selected driverless transport vehicle changes its trajectory as a function of the received signal, that is to say it reschedules its trajectory such that, upon receiving the signal, the selected driverless transport vehicle is moved along a further trajectory, different from the previously mentioned trajectory, that is to say it travels along the further trajectory.

A particularly advantageous traffic flow of the driverless transport vehicles moving and thereby travelling, for example, within a plant or a building such as a workshop, for example, can be implemented by means of the invention, such that a particularly high system throughput can be implemented with regard to the goods to be conveyed, in particular components, which are in particular automatically transported by means of the driverless transport vehicles. Blockages of the driverless transport vehicles, which are also referred to as deadlocks, can in particular also be avoided by the invention. Blockages are understood to mean in particular the formation of backlogs in the context of which at least one of the driverless transport vehicles, or else both or all driverless transport vehicles, are stopped for an excessive time and/or stopped simultaneously. The invention is based in particular on the following concepts and ideas: as opposed to track-bound driverless transport vehicles which travel along a respective, fixedly pre-defined movement path (trajectory) and do not per se compute this movement path or even change the latter, in particular while travelling, a particularly advantageous traffic flow, or a particularly advantageous traffic control, can be implemented by track-independent driverless transport vehicles, such as the driverless transport vehicles according to the invention, which in principle move freely, i.e. travel freely and per se compute their respective dedicated trajectory and per se schedule their respective trajectory during their respective journey and thereby in particular change, i.e. reschedule, their respective trajectory, as a result of which a particularly high system throughput can be implemented, in particular with regard to transporting goods to be conveyed. As a result of using the track-independent driverless transport vehicles, the following disadvantages of conventional, already existing solutions that use track-bound driverless transport vehicles which are moved according to a fixedly pre-defined and thereby virtual or else physically existent block section system or an itinerary topology can in particular be avoided:

- requirement of a pre-defined itinerary topology or block section system along a railway track;
- novel driverless transport vehicles no longer require a pre-defined itinerary topology and can freely navigate in space such that previous approaches to traffic control cannot be applied;
- previous approaches to traffic control are based on clearly defined, or fixedly pre-defined, traffic conditions which are in particular pre-defined by a fixedly pre-defined itinerary topology, whereas freely navigating transport vehicles can generate traffic situations of any type and therefore require an algorithm, consequently a method, for coordinating the track-independent driverless transport vehicles, wherein the algorithm, or the method, is sufficiently generic to react to different situations, for example based on a generic set of rules.

It has also been found, however, that in particular when no corresponding countermeasures have been taken, a blockage of the track-independent driverless transport vehicles can arise such that at least one of the track-independent driverless transport vehicles or even both track-independent driverless transport vehicles experience excessively long stoppages. It is conceivable, for example, that one of the track-independent driverless transport vehicles hits an obstacle and consequently stops, wherein another track-independent driverless transport vehicle then overtakes the stopped transport vehicle and consequently likewise hits the obstacle and then likewise remains stopped. It is furthermore conceivable that a track-independent driverless transport vehicle bypasses an obstacle and then moves into the opposing traffic, so to speak, i.e. moves onto or into a trajectory of another transport vehicle such that the transport vehicles collide or else come to a stop. Such and other situations in which collisions and/or any other blockage such as a backlog of the driverless transport vehicles can arise can now be avoided on account of the method according to the invention.

The respective trajectory is also referred to as roadway, motion path or path and is computed, i.e. scheduled, by means of the respective driverless transport vehicle per se. The respective driverless transport vehicle, also simply referred to as vehicle, transmits, in particular each second, a current position, for example, and its scheduled roadway to the central traffic control (central electronic computing installation) which receives the respective roadway and preferably also the respective current position. Based on the received path, and optionally based on the received current position, the respective space requirement of the respective vehicle along the respective roadway is ascertained, in particular proceeding from the current position for a pre-defined or pre-definable route, for example in meters. As soon as the central traffic control ascertains that the ascertained, in particular computed, space requirements of the two vehicles intersect, that is to say at least partially overlap one another, the traffic control identifies a traffic conflict. For the traffic conflict, in particular for each traffic conflict identified by the traffic control, it is checked which of the driverless transport vehicles, also referred to simply as vehicles, which is involved in the respective traffic conflict, or generates the respective traffic conflict, is to be changed in terms of its movement and/or trajectory. For the, or each, identified traffic conflict it is in particular checked or ascertained which of the vehicles involved in the traffic conflict is to be stopped. This means that in particular exactly one of the vehicles involved in the respective traffic conflict, or generating the traffic conflict, is selected, wherein the selected vehicle is initiated to stop, in particular by means of the previously described signal. In particular, the selected driverless transport vehicle which is consequently stopped, for example, is kept stopped for so long, i.e. kept stationary, until the traffic conflict has been resolved, that is to say until the overlap of the space requirements has been resolved. As a result, blockages such as, for example, collisions and backlogs can be avoided, as a result of which goods to be conveyed can be particularly advantageously conveyed, i.e. transported, by means of the driverless transport vehicles.

It has been demonstrated to be particularly advantageous when the signal initiates the selected driverless transport vehicle to change its movement along its trajectory, i.e. along the trajectory of the selected driverless transport vehicle, in such a manner that the selected driverless transport vehicle initially travelling along its trajectory is stopped. As a result, undesirable and excessive backlogs of the driverless transport vehicles can be advantageously avoided, just like undesirable collisions of the driverless transport vehicles, wherein both driverless transport vehicles are however stopped, for example.

The invention makes it possible in particular to be able to carry out the following traffic situations without undesirable effects, for example without undesirable backlogs:

A driverless transport vehicle avoids an obstacle and travels into the oncoming traffic, i.e. onto or into the trajectory of the other driverless transport vehicle travelling toward the one driverless transport vehicle, or into or onto a trajectory disposed beside the latter while another driverless transport vehicle is overtaking.

Crossings whereby two driverless transport vehicles simultaneously travel on a crossing.

A driverless transport vehicle travels ahead of another driverless transport vehicle, whereby the one driverless transport vehicle decelerates or stops because it detects an obstacle. Without the method according to the invention, i.e. without the traffic control implementable by the method according to the invention, the other driverless transport vehicle will overtake the one driverless transport vehicle and most probably also come to a stop thereafter because it detects the same obstacle. This leads to both driverless transport vehicles coming to a stop next to one another, blocking an entire corridor, for example. This can be avoided only by the method according to the invention.

A driverless transport vehicle departs from its originally scheduled trajectory, that is to say it reschedules its trajectory. When in the process another driverless transport vehicle overtakes the one driverless transport vehicle or travels toward the one driverless transport vehicle in such a manner that the trajectories of the driverless transport vehicles intersect or contact one another and/or when the space requirements overlap one another, in particular exactly one of the driverless transport vehicles should be stopped in order to avoid a collision. This is also advantageously possible as a result of the invention.

Head-on collisions can be avoided.

A further embodiment is distinguished in that, once the selected driverless transport vehicle has stopped and while the selected driverless transport vehicle is stopped, the other driverless transport vehicle travels, in particular travels onward, along its, in particular originally scheduled, trajectory. As a result, undesirable effects such as collisions can be avoided, on the one hand. On the other hand, the other driverless transport vehicle can travel onward such that a stoppage of both driverless transport vehicles can be avoided.

In a further, particularly advantageous embodiment of the invention it is provided that when it is ascertained by means of the central electronic computing installation that the other driverless transport vehicle has travelled so far that any overlap of the space requirements is precluded, or the overlap is eliminated, the central electronic computing installation transmits, in particular wirelessly, to the selected driverless transport vehicle a further, in particular electrical, signal by means of which the selected driverless transport vehicle which receives the further signal is initiated to end its stoppage and to travel onward, in particular along the originally scheduled trajectory. As a result, a particularly high system throughput with regard to transporting goods to be conveyed can be implemented, because any excessively long stoppage of the selected driverless transport vehicle can be avoided. The previous and following explanations pertaining to the first signal, in particular with regard to the transmission and reception thereof, can readily also be applied to the further signal and vice versa.

In a further, particularly advantageous design embodiment of the invention it is provided that the criterion comprises a respective speed, for example different from 0, of the respective driverless transport vehicle that travels at the respective speed along its trajectory. In this way, it is provided in the fourth step of the method, for example, that the respective speed, also referred to as the travel speed, of the respective driverless transport vehicle is ascertained, in particular by means of the central electronic computing installation. In the process, a driverless transport vehicle is selected, for example from the first and the second driverless transport vehicle, as a function of the ascertained speeds. In this way, that driverless transport vehicle of which the speed is higher or lower than that of the other driverless transport vehicle can be selected, for example.

A further embodiment is distinguished in that the criterion comprises that the first or the second driverless transport vehicle travels forward or backward. In other words, in the fourth step of the method, for example, a forward travel or a reverse travel of the first driverless transport vehicle and a forward travel or a reverse travel of the second driverless transport vehicle is ascertained, in particular by means of the central electronic computing installation, wherein the driverless transport vehicle is then selected as a function of the respective ascertained forward travel or reverse travel. As a result of the speed and/or the forward travel or reverse travel being considered, a particularly advantageous traffic flow and, as a result, a particularly high throughput can be implemented, the latter also being referred to as the system throughput.

In order to implement a particularly advantageous traffic flow it is provided in a further design embodiment of the invention that at least one point at which the space requirements overlap one another is ascertained by means of the central electronic computing installation. The point can be understood to be a location or an overlap region at which, or in which, the space requirements overlap one another. The overlap region is in particular a sub-region of the previously mentioned first region, and a sub-region of the previously mentioned second region. Furthermore, in this context it is preferably provided that the criterion comprises a respective distance of the respective driverless transport vehicle from the point, i.e. from the overlap region. In other words, it is provided for example that, in particular by means of the central electronic computing installation, a first distance of the first driverless transport vehicle from the point and a second distance of the second driverless transport vehicle from the point are ascertained. In the process, the driverless transport vehicle is selected from the first and the second driverless transport vehicle as a function of the distances.

It has proven to be particularly advantageous when that driverless transport vehicle of which the distance from the point is larger than that of the other driverless transport vehicle is selected from the first and the second driverless transport vehicle. As a result, in particular in a convoy situation, in which the driverless transport vehicles travel one behind the other, it can be avoided that both driverless transport vehicles are brought to a respective stop, in order to avoid collisions. In this way, a particularly high system throughput can be implemented as a result.

Finally, it has proven particularly advantageous when the criterion comprises at least one of a plurality of potential mutually dissimilar operating states of the respective driverless transport vehicle. In other words, in the context of the method according to the invention it is preferably provided that the respective driverless transport vehicle can assume a plurality of dissimilar operating states. A first one of the operating states is, for example, that the respective driverless transport vehicle, in particular the energy store thereof which is configured for storing electric energy or electric current, is charged such that the driverless transport vehicle of which the energy store is being charged is stopped anyway. A second one of the operating states is, for example, that the driverless transport vehicle travels along its trajectory. A third one of the operating states is, for example, that the driverless transport vehicle is stopped but without being charged in the process. In this way, it is preferably provided in the fourth step of the method that the driverless transport vehicle is selected from the first and the second driverless transport vehicle as a function of the operating states in which the driverless transport vehicles are at the moment, i.e. currently are. It can be avoided as a result, for example, that when one of the driverless transport vehicles is stopped anyway, for example because it is being charged, the other driverless transport vehicle is also stopped, for example, so that a particularly high system throughput can be implemented.

A second aspect of the invention relates to a system for carrying out a method according to the invention and according to the first aspect of the invention. Advantages and advantageous design embodiments of the first aspect of the invention are to be considered advantages and advantageous design embodiments of the second aspect of the invention and vice versa.

Further details of the invention are derived from the description hereunder of a preferred exemplary embodiment by way of the appended drawings, in which:

DETAILED DESCRIPTION OF THE DRAWINGS

Identical or functionally equivalent elements are provided with the same reference signs in the figures.

Figure 1:
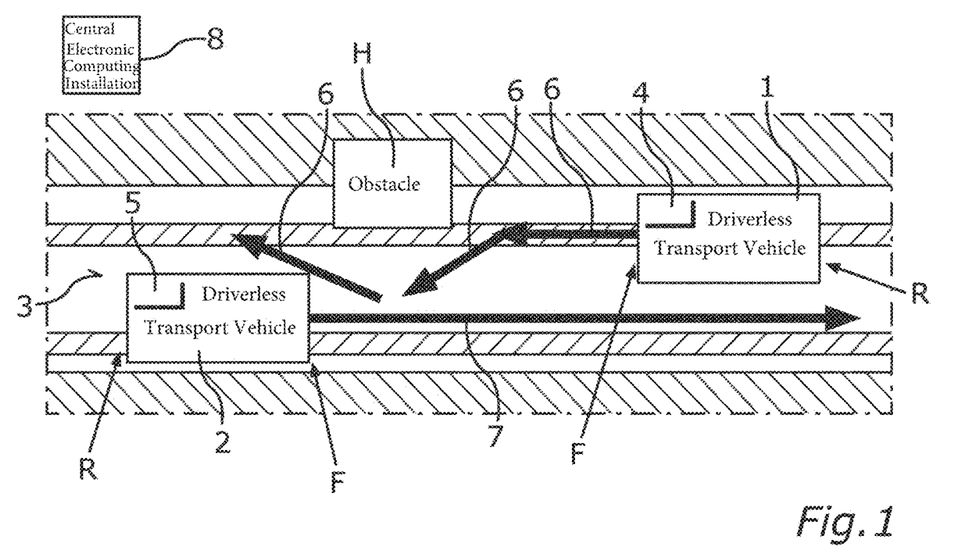
FIG. 1 shows a schematic view from above onto two track-independent driverless transport vehicles which are operated and thereby driven by means of a method according to the invention.

FIG. 1 shows in a schematic view from above two driverless transport vehicles 1 and 2 which are used for transporting goods to be conveyed such as, for example, components, for producing products such as, for example, motor vehicles, in particular automobiles and most particularly passenger automobiles, from which the products are manufactured. The respective driverless transport vehicle 1 or 2 hereunder is also simply referred to as a vehicle or else as a robot, because the respective driverless transport vehicle 1 or 2 preferably travels automatically, in particular fully automatically, on a floor 3 and along the floor 3. The respective vehicle is thus a floor-bound driverless vehicle, where in the respective vehicle is however a track-independent vehicle. This is to be understood such that the respective vehicle in principle is freely movable, i.e. can travel freely, in space, i.e. for example within a building such as, for example, a shed, in particular along the floor 3. This is to be understood in particular as meaning that the respective vehicle per se calculates its respective trajectory along which the vehicle travels. In this way, the respective trajectory is not fixedly pre-defined as in a block control system, for example, but is, in particular dynamically, computed and thus generated by the respective vehicle per se, in particular during a respective journey of the respective vehicle. To this end, the respective vehicle comprises, for example, a mobile electronic computing installation 4 or 5, which is held at least indirectly on a respective running gear of the respective vehicle, for example. The respective running gear comprises, for example, floor-contacting elements, in particular wheels, by way of which the respective vehicle is able to be supported, or is supported, in the vertical direction downward on the floor 3, in particular in such a manner that when the respective vehicle travels on the floor 3 and along the floor 3 and thereby along its respective trajectory, while the respective vehicle in the vertical direction downward is supported on the floor 3 by way of the floor-contacting elements of the vehicle, the floor-contacting elements roll on the floor 3. In this way, the respective vehicle also has at least one respective drive motor, for example, by means of which at least one or at least two of the respective floor-contacting elements of the respective vehicle is/are able to be driven. For example, the drive motor is an electric motor which is able to be operated by means of electric energy, in particular electric current. It is preferably provided here that the respective vehicle also comprises an electric energy store for storing electric energy, or electric current. The respective drive motor can be supplied with the electric energy stored in the respective energy store and be operated by means of the electric energy stored in the respective energy store, so as to drive the at least one floor-contacting element of the respective vehicle and thus the respective vehicle while utilizing the electric energy, and as a result to travel along the respective trajectory.

In FIG. 1 the trajectory of the driverless transport vehicle 1 computed by the driverless transport vehicle 1 is visualized by arrows 6, and the trajectory of the driverless transport vehicle 2 computed by the driverless transport vehicle 2 is visualized by an arrow 7 in FIG. 1. It can be seen that when the respective vehicle travels along its respective trajectory, the respective vehicle, and thus the respective mobile electronic computing installation 4 or 5 thereof, move relative to the floor 3.

A method for coordinating the driverless transport vehicles 1 and 2, in particular the journeys thereof, will be described hereunder. Used in the method is a central electronic computing installation 8 which is provided additionally to the mobile electronic computing installations 4 and 5 and is external in terms of the mobile electronic computing installations 4 and 5. Moreover, the mobile electronic computing installations 4 and 5 are external in terms of one another. This is to be understood in particular such that the mobile electronic computing installations 4 and 5 are not component parts of the central electronic computing installation 8 and vice versa. The central electronic computing installation is in particular locationally fixed. This is to be understood in particular such that a movement of the central electronic computing installation 8 relative to the floor 3 is precluded. The central electronic computing installation 8 is also referred to as the central traffic control. As will be explained in more detail hereunder, against the background that the driverless transport vehicles 1 and 2 per se, by means of their mobile electronic computing installation 4 and 5, compute their trajectories and in this way can move almost freely around in space, it may appear disadvantageous or even redundant at first glance that the central electronic computing installation 8 is used additionally to the mobile electronic computing installations 4 and 5, the central electronic computing installation 8 potentially being able to be specifically avoided in that the driverless transport vehicles 1 and 2 per se compute their trajectories. In the use of the track-independent driverless transport vehicles 1 and 2 it has however been established that situations, in particular traffic situations, can arise which may lead to an undesirable formation of blocks and thereby in particular to a backlog in the context of which both driverless transport vehicles 1 and 2 come to a stop, whereby such undesirable situations can be avoided by using the central electronic computing installation 8. In this way, a particularly high throughput, also referred to as a system throughput, can be implemented by the method described hereunder and in particular by using the electronic computing installation 8, in particular with regard to a time-effective and cost-effective transportation of the aforementioned goods to be conveyed by means of the driverless transport vehicles 1 and 2 which can also be referred to as driverless transport systems.

The respective vehicle has a respective front F and a respective rear R, wherein the respective vehicle travels forward, that is to say performs forward travel, when the respective vehicle travels with its front F ahead. The respective vehicle can also travel with its respective rear R ahead, such that the respective vehicle in this instance travels backward, that is to say performs reverse travel. For example, it is provided that no LIDAR sensor but only a bumper bar and a sonar sensor for avoiding potential accidents such as collisions are provided on the respective rear R. Nevertheless, a formation of blocks such as, for example, a backlog, in the context of which both driverless transport vehicles 1 and 2 come to a stop can be avoided by the method. A further background of the method can include that the respective vehicle, in particular the respective mobile electronic computing installation 4 or 5 thereof, considers or characterizes all objects which are detected by means of a respective sensor of the respective vehicle, for example, to be stationary objects. Even when the respective vehicle detects another travelling vehicle travelling toward the respective vehicle by means of its sensor, the respective vehicle will not consider the other vehicle to be a moving vehicle and will thus not correspondingly adapt its behavior, in particular in customary solutions. This can also lead to the formation of blocks, i.e. to blockages of the vehicles, which can now be avoided by the method. In a first step of the method, the central electronic computing installation 8 (central traffic control) receives the trajectory of the driverless transport vehicle 1, which has been computed by the driverless transport vehicle 1 per se and is also referred to as the first trajectory. In a second step of the method, the central electronic computing installation 8 receives the trajectory of the driverless transport vehicle 2 which has been computed or generated by the driverless transport vehicle 2 per se and is also referred to as the second trajectory.

It can be seen from FIG. 1 that the driverless transport vehicle 1 by means of its mobile electronic computing installation 4 computes and thus schedules its trajectory in such a manner that the trajectory of the driverless transport vehicle 1 bypasses an obstacle H in such a manner that, if the driverless transport vehicle 1 travels or would travel along its trajectory, the driverless transport vehicle 1 bypasses or would bypass the obstacle H without a collision between the driverless transport vehicle 1 and the obstacle H occurring. It is conceivable in particular here that the driverless transport vehicle 1 schedules its trajectory without consideration of the driverless transport vehicle 2 and the trajectory of the latter such that it can arise that the trajectories of the driverless transport vehicles 1 and 2, in particular the scheduled trajectories of the driverless transport vehicles 1 and 2, intersect such that the space requirements 10 and 11 inevitably at least partially overlap one another, or the space requirements 10 and 11 of the driverless transport vehicles 1 and 2 partially overlap one another, however without the trajectories of the driverless transport vehicles 1 and 2 intersecting or contacting one another.

Figure 2:
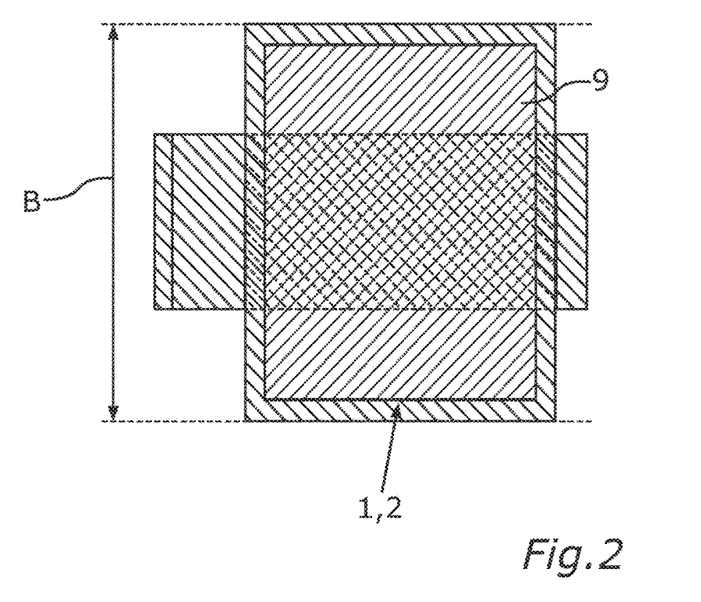
FIG. 2 shows a further schematic view from above of one of the driverless transport vehicles.

It can be seen from FIG. 2 that the respective driverless transport vehicle 1 or 2 is not only to be understood to be a transport vehicle per se, configured for transporting goods to be conveyed, but rather an entity composed of the transport vehicle per se and the goods to be conveyed, which are designated by the reference sign 9 and transported by means of the transport vehicle. This is particularly advantageous with regard to a third step of the method, because in the third step of the method, a first space requirement 10 of the driverless transport vehicle 1 (including its goods to be conveyed) and a second space requirement 11 of the driverless transport vehicle 2 (including its goods to be conveyed) along the respective trajectory is ascertained by means of the central electronic computing installation 8, as can be seen from FIG. 3. The first trajectory of the driverless transport vehicle 1 is designated with the reference sign 12 in FIG. 3, while the second trajectory of the driverless transport vehicle 2 is designated with the reference sign 13 in FIG. 3. The first space requirement 10 along the trajectory 12 is understood to mean a first tubular driveway or a first region 14 through which the driverless transport vehicle 1 travels or would travel if it travels or would travel along its trajectory 12. Consequently, the second space requirement 11 is understood to mean a second tubular driveway or a second region 15 through which the driverless transport vehicle 2 travels or would travel if it travels or would travel along its trajectory 13.

Figure 3:
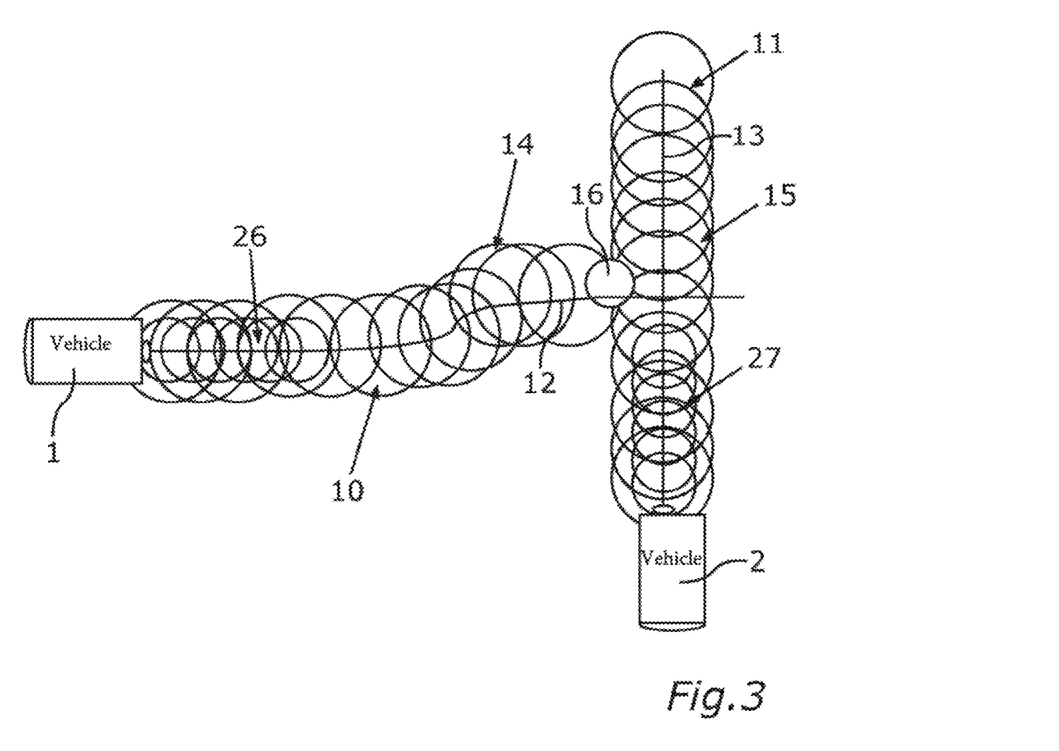
FIG. 3 shows a further schematic view from above of the driverless transport vehicle.

In a fourth step of the method it is ascertained by means of the central electronic computing installation 8 that the space requirements 10 and 11, that is to say the regions 14 and 15, at least partially overlap one another, i.e. intersect or at least partially lie in one another. In other words, it is ascertained that the regions 14 and 15 overlap one another in at least one common region 16, the latter thus being a sub-region of the region 14 and a sub-region of the region 15. Again, in other words, at least one point at or in which the regions 14 and 15 overlap one another is ascertained, for example, wherein the point presently is the region 16 or lies in the region 16. For example, the region 16 can be at least punctiform and thus considered to be at least a point.

It can be seen from FIG. 2 that the respective driverless transport vehicle 1 or 2 has external dimensions, wherein one of the external dimensions is designated with the reference sign B in FIG. 2. The external dimension B is, for example, a width of the driverless transport vehicle 1 or 2 in the loaded state of the transport vehicle 1 or 2, wherein the width runs, for example, in particular always perpendicularly to a respective tangent on the respective trajectory 12 or 13, wherein the tangent runs through a point, in particularly the center and/or the center of gravity of the respective driverless transport vehicle 1 or 2 on its respective trajectory 12 or 13, for example. In other words, the width B here is the width of the transport vehicle 1, 2 in the loaded state. In this case, the load is substantially wider than the vehicle per se, or the robotic transporter thereof. Accordingly, the loaded state is in particular always considered. The respective space requirement 10 or 11 is ascertained in such a manner, for example, that a virtual circle is plotted about the respective point of the respective vehicle, the center of the circle lying on the point in particular in such a manner that the respective driverless transport vehicle 1 or 2 lies completely within the circle. In this way, the point lies on the respective trajectory 12 or 13. Such a circle is then generated for each point or for some points on the trajectory 12 or 13, wherein the sum of the circles results in the respective region 14 or 15, that is to say the respective space requirement 10 or 11.

It can be provided that the respective vehicle, in particular its respective mobile electronic computing installation 4 or 5, has a safety system so as to implement a particularly high level of safety. This safety system is intended to avoid accidents or collisions, in particular in that the safety system brings the respective vehicle to a stop, and/or at least reduces a respective speed at which the respective vehicle travels, in particular along its respective trajectory 12 or 13, in particular in regions of crossings and/or pre-definable or pre-defined regions with a speed restriction. It can be provided that the respective vehicle tends to travel in the center of a roadway so that the vehicle can maintain a maximum distance to all objects in its environment and in the process travel at a maximum speed, or at an ideally high speed, respectively. However, it also conceivable for directional zones to be used in order to bring the respective vehicle to travel not in the center but on the right or the left side so as to make it possible in particular for the vehicles to overtake one another in particular when the roadway is wide enough.

When it is now ascertained by means of the central electronic computing installation 8 that the space requirements 10 and 11 at least partially overlap one another, one driverless transport vehicle is selected by means of the central electronic computing installation 1 from the first driverless transport vehicle 1 and the second driverless transport vehicle 2 by way of at least one criterion. Furthermore, the central electronic computing installation 8 transmits at least one, in particular electrical, signal to the selected driverless transport vehicle that receives the signal. By means of the signal, the selected driverless transport vehicle is initiated to per se change its movement along its trajectory and/or to change its trajectory. For example, it is ascertained by means of the central electronic computing installation 8 that the space requirements 10 and 11 at least partially overlap one another, while the driverless transport vehicles 1 and 2 travel along their trajectories 12 and 13. In the exemplary embodiment shown in the figures it is provided here that, by means of the signal, the selected driverless transport vehicle is initiated to change its movement along its trajectory in such a manner that the selected transport vehicle which initially travels along its trajectory stops, in particular while the respective other driverless transport vehicle travels onward along its trajectory. The method comprises for example three sets of logic which are carried out in parallel. A first one of the set of logics is visualized by a flow chart shown in FIG. 5; a second one of the set of logics is visualized by a flow chart shown in FIG. 6, and the third set of logic is visualized by a flow chart shown in FIG. 7. An idea on which the method is based lies in particular in finding an ideally simple approach in order to avoid undesirable formation of blocks, or backlogs, of the vehicles. The method can be used as a traffic control concept for accumulating experience and, building on the latter, developing more complex traffic controls. The approach provides in particular to ascertain the respective space requirement 10 or 11 of the respective vehicle along the respective trajectories 12 or 13, respectively, and to check whether any traffic conflict, that is to say an at least partial overlap of the space requirements, arises. If this is the case, preferably exactly one of the driverless transport vehicles 1 and 2 is thus stopped. In other words, it is preferably provided that in terms of the driverless transport vehicles 1 and 2 exclusively one of the driverless transport vehicles 1 and 2 is stopped, while the respective other driverless transport vehicle 2 or 1 travels onward along its respective trajectory 13 or 12, respectively. The signal is thus a stop signal, for example, which brings the selected driverless transport vehicle to a stop. The stop signal is intended to avoid any situation in which the two vehicles are so close to one another that the other vehicle cannot bypass the one stopped vehicle, for example. Moreover, the method can facilitate the respective vehicle during reversing, for example.

Figure 5:
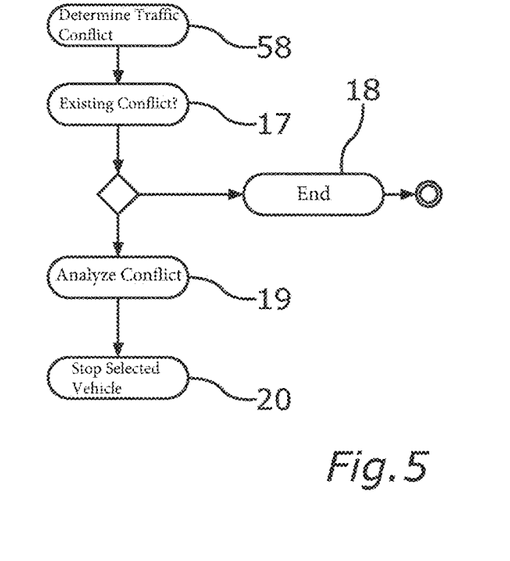
FIG. 5 shows a flow chart for visualizing the method.

As a result of the first set of logic visualized in FIG. 5, the selected vehicle is stopped, for example. In a block 58 of the first set of logic, the or a traffic conflict is ascertained. In other words, in block 58 it is ascertained that the space requirements 10 and 11 at least partially overlap one another, for example. In a block 17 it is ascertained whether the traffic conflict ascertained in block 58 is an already ascertained or existing conflict. This can take place, for example, by querying a database in which detected traffic conflicts are entered, such that when for example the traffic conflict ascertained in block 58 is already entered in the database the traffic conflict ascertained in block 58 is an already existing traffic conflict. If the traffic conflict ascertained in block 58 is not yet entered in the database, the traffic conflict ascertained in block 58 is thus a new, not yet existing traffic conflict. If the traffic conflict ascertained in block 58 is an already existing traffic conflict, the first set of logic moves to a block 18 in which the set of logic ends, that is to say no further steps are carried out. However, if the traffic conflict ascertained in block 58 is a new, not yet existing traffic conflict, the traffic conflict ascertained in block 58 is analyzed in a block 19. In particular, a driverless transport vehicle is selected from the driverless transport vehicles 1 and 2 in block 19. In a block 20, the selected driverless transport vehicle is stopped, and the traffic conflict ascertained in block 58 is entered in the database.

Figure 6:
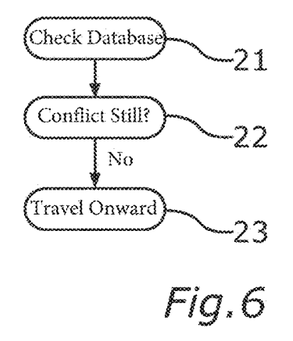
FIG. 6 shows a further flow chart for further visualizing the method.

The set of logic visualized in FIG. 6 ensures reinstatement of the selected driverless transport vehicle which has been stopped in block 20. In other words, in a block 21 of the second set of logic, the database is checked for traffic conflicts. In other words, the traffic conflicts entered in the database are queried in block 21, for example. In a block 22 it is checked whether the respective traffic conflict retrieved from or queried in the database still exists. If the traffic conflict which was retrieved from the database in block 21 no longer exists, then, in a block 23, the selected and stopped driverless transport vehicle which, in block 21, has been retrieved from the database and has been stopped and is thus stationary is initiated to cancel its stoppage and travel onward along its trajectory, for example. This takes place in such a manner, for example, that the central electronic computing installation 8 provides a further signal and transmits the latter to the selected, stopped, driverless transport vehicle which receives a further, in particular electrical, signal. By means of the further signal the selected, stopped, driverless transport vehicle is initiated to end its stoppage and to travel onward, in particular along its trajectory.

Figure 7:
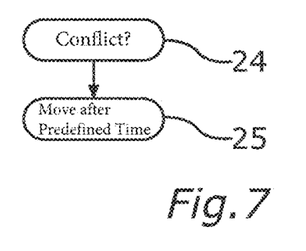
FIG. 7 shows a further flow chart for further visualizing the method.

In a block 24 of the third set of logic shown in FIG. 7 it is checked whether the driverless transport vehicles, such as the driverless transport vehicles 1 and 2, for example, are stuck in a traffic conflict, that is to say are involved in a traffic conflict. If the driverless transport vehicles are involved in a traffic conflict for more than, for example, a pre-definable or pre-defined duration of x seconds, for example, or cause that traffic conflict, and in particular no exception applies, the driverless transport vehicles are released, that is to say started or moved onward, in a block 25.

It can be seen that the set of logics are provided for in particular exactly two driverless transport vehicles, that is to say for traffic conflicts of in particular exactly two driverless transport vehicles. This is based on the assumption that at least almost every traffic conflict starts with a conflict of in particular exactly two driverless transport vehicles, wherein further vehicles may in each case be involved in the traffic conflict in the further temporal course of the traffic conflict. It is readily possible for the method and the sets of logic described to be applied to traffic situations or traffic conflicts in which more than two driverless transport vehicles are involved.

It can be seen from FIG. 3 that it can furthermore be provided that for the respective driverless transport vehicle 1 or 2 a respective stopping region 26 or 27, respectively, also referred to as a braking region, can be ascertained, in particular computed, in particular by means of the central electronic computing installation 8. The respective stopping region 26 or 27 is a region in which the initially travelling driverless transport vehicle 1 or 2 will come to a stop with a high degree of probability when the central electronic computing installation 8 transmits, or would transmit, the stopping signal to the respective driverless transport vehicle 1 or 2, respectively, at a specific point in time, in particular at the present point in time. It is conceivable here that a, or the, driverless transport vehicle is selected from the driverless transport vehicles 1 and 2 as a function of the ascertained stopping regions 26 and 27. Alternatively or additionally, the vehicle is selected as a function of respective distances of the driverless transport vehicles 1 and 2 from the region 16, i.e. from the point in or at which the space requirements 10 and 11 overlap one another.

Alternatively or additionally, it is also conceivable that the respective region 14 or 15, also referred to as a conflict region, is ascertained so as to have a pre-definable or pre-defined length of the respective region 14 or 15 along the respective trajectory 12 or 13, respectively, wherein the respective length proceeds in particular from the aforementioned point of the respective vehicle and extends in particular along the trajectory 12 or 13 in the travel direction of the respective vehicle that moves in the travel direction along the respective trajectory 12 or 13, that is to say travels in the travel direction along the respective trajectory 12 or 13, respectively. A length of the conflict region of 7 meters has proven particularly advantageous.

The respective vehicle transmits in particular its current position along its respective trajectory 12 or 13 to the computing installation 8, wherein the respective position of the respective vehicle corresponds in particular to a point of the respective trajectory 12 or 13 of the respective vehicle. Proceeding from the position, the computing installation 8 can then compute the respective conflict region, in particular the length of the latter. It is furthermore preferably provided that the respective vehicle transmits its orientation to the computing installation 8 such that the computing installation 8 can ascertain in which direction the respective vehicle travels along its respective trajectory 12 or 13 by way of the orientation. This direction is utilized by the electronic computing installation 8 in such a manner, for example, that the electronic computing installation 8 proceeding from the position computes the conflict region, in particular having the corresponding length, in the direction that is the travel direction, for example. Furthermore, the respective vehicle can transmit further coordinates to the computing installation 8, wherein the coordinates characterize a path of the respective vehicle from its current position to its destination, for example. The computing installation 8, in particular based on the current position, the orientation, in particular the direction or travel direction, and based on the further coordinates, for example, computes the respective conflict region, that is to say the respective region 14 or 15, and thus the respective space requirement 10 or 11, respectively. If the conflict regions overlap one another, this is considered to be a traffic conflict, or the aforementioned traffic conflict.

Figure 4:
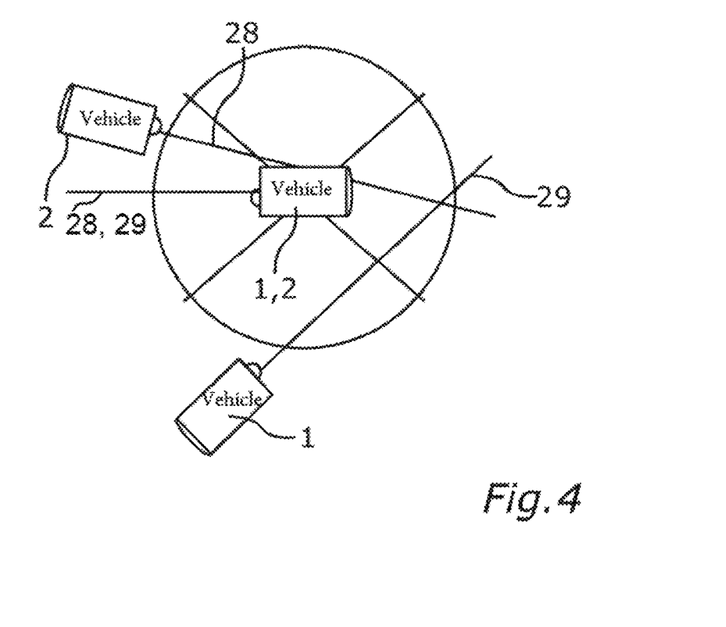
FIG. 4 shows a further schematic view from above of the driverless transport vehicles.

The respective orientation of the respective vehicle can be seen from FIG. 4, for example. For example, a straight line 28 visualizes the orientation of the driverless transport vehicle 2, and a straight line 29 visualizes the orientation of the driverless transport vehicle 1. The vehicle is selected as a function of the orientations, for example. This can be understood to mean in particular that the vehicle is selected as a function of a, in particular the, smallest angle enclosed by the straight lines 28 and 29. Alternatively or additionally it is conceivable that an environment of the respective vehicle in the circumferential direction running about the vertical direction is divided into different segments, wherein the vehicle is selected as a function of the segment in which the respective vehicle is situated and/or through which segment the respective straight line 28 or 29 runs, for example.

Figure 8:
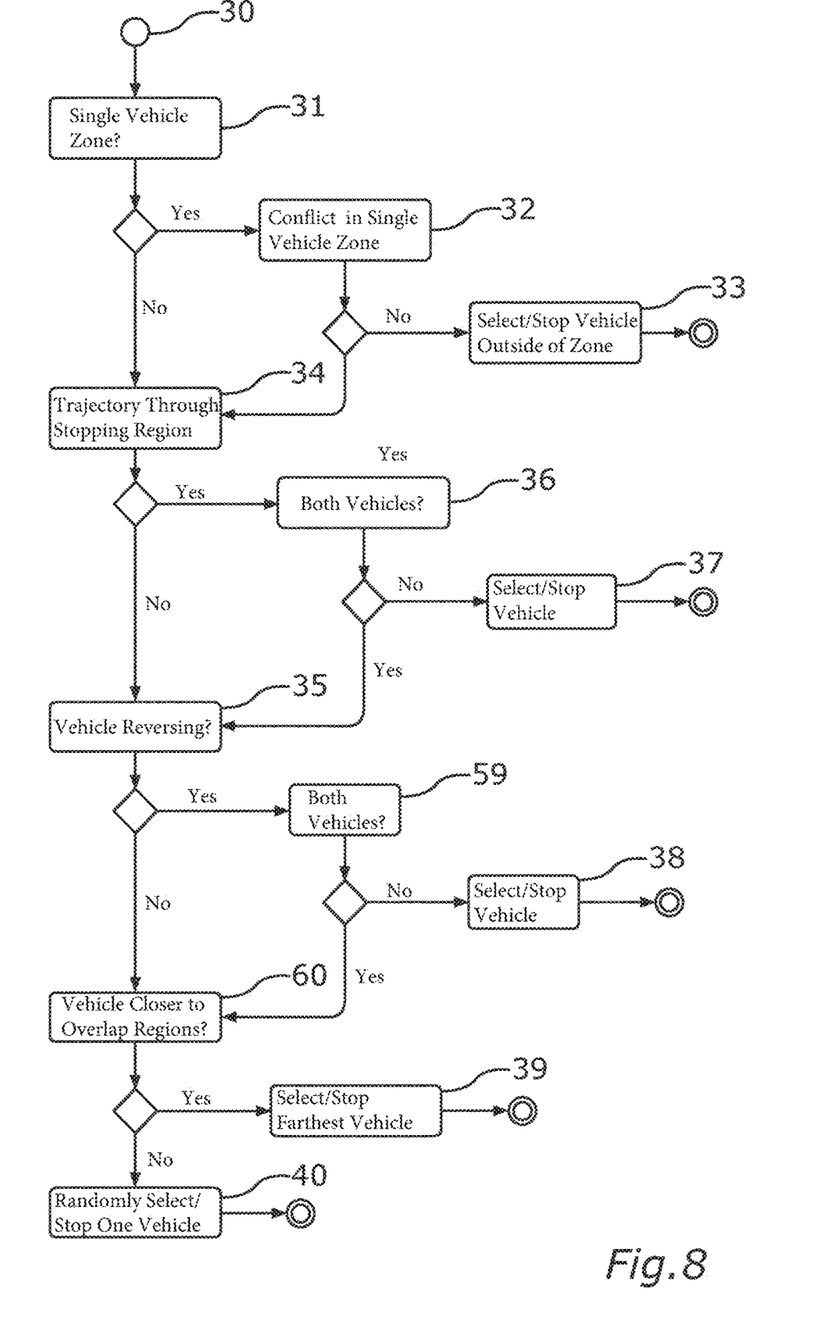
FIG. 8 shows a further flow chart for further visualizing the method.

FIG. 8 shows a further flowchart for further visualizing the method. FIG. 8 visualizes in particular a routine or a set of logic which starts at an initial point 30. A traffic conflict, or the previously mentioned traffic conflict, was ascertained at the initial point 30. In a block 31 it is checked whether one of the vehicles involved in the traffic conflict, or causing the traffic conflict, is situated in a zone for which it is defined, for example, that only a single driverless transport vehicle can be within the zone at any one time. If this is the case, it is checked in a block 32 whether the two vehicles involved in the traffic conflict are situated in the zone. If this is not the case, the vehicle that is not within the zone but outside the zone is selected and stopped in a block 33. If it is ascertained in block 31 that none of the vehicles involved in the traffic conflict is within the zone, or it is ascertained in block 32 that both vehicles involved in the traffic conflict are within the zone, it is thus checked in a block 34 whether one of the vehicles involved in the traffic conflict has scheduled its trajectory through the stopping region of the other vehicle. If this is not the case, the set of logic moves to a block 35. Otherwise, the set of logic moves to a block 36 in which it is ascertained or checked, respectively, whether both vehicles involved in the traffic conflict have scheduled their trajectories through both stopping regions, i.e. whether the trajectory 12 runs through the stopping region 27 and the trajectory 13 runs through the stopping region 26. If this is the case, the set of logic moves to block 35. Otherwise, the set of logic moves to a block 37 in which that vehicle of which the trajectory runs through the stopping region of the respective other vehicle is selected and stopped.

In block 35 it is ascertained or checked, respectively, whether one of the vehicles involved in the traffic conflict is reversing. If this is the case, the set of logic moves to a block 59. Otherwise, the set of logic moves to a block 60. In block 59 it is checked or ascertained, respectively, whether both vehicles are reversing. If this is the case, the set of logic moves to block 60. Otherwise, the set of logic moves to a block 38 in which the vehicle that is reversing is selected and stopped. In block 60 it is ascertained or checked, respectively, whether one of the vehicles involved in the traffic conflict is situated closer to the overlap regions than the other. In other words, the region 16 or the point at or in which the space requirements 10 and 11 overlap one another is also referred to as the collision region or the collision point. In this way, a first distance of the driverless transport vehicle 1 from the collision point, and a second distance of the driverless transport vehicle 2 from the collision point, is computed, wherein the driverless transport vehicle is selected from the driverless transport vehicles 1 and 2 as a function of the distances. If it is ascertained in block 60 that one of the vehicles is situated closer to the collision point than the other vehicle, and it is thus determined that one of the distances is smaller than the other, or vice versa, the set of logic moves to a block 39. In block 39, that driverless transport vehicle 1 or 2 of which the distance from the conflict point (region 16) is larger than that of the other driverless transport vehicle 2 to 1 is selected. In other words, the vehicle having the largest distance from the conflict point is selected and stopped. If it is ascertained in block 60 that neither of the vehicles is situated closer to the collision point than the other, such that it is ascertained in block 60, for example, that the distances are identical, the set of logic moves to a block 40. In block 40 a driverless transport vehicle is selected randomly, i.e. based on coincidence, from the driverless transport vehicles 1 and 2 and stopped.

Figure 9:
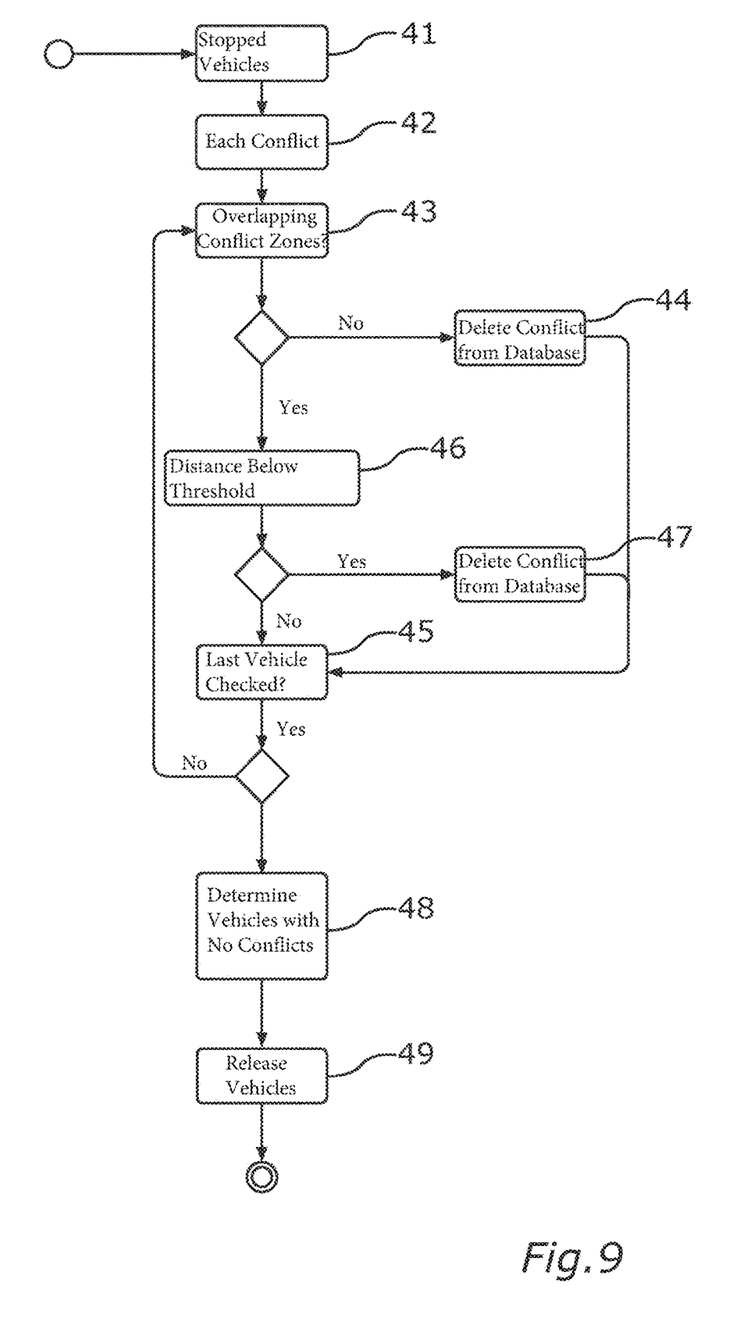
FIG. 9 shows a further flow chart for further visualizing the method.

FIG. 9 shows a further flowchart for further visualizing the method. In a block 41, for example by way of the database and the traffic conflicts entered therein, a list of vehicles stopped by means of the electronic computing installation 8 is ascertained. A block 42 visualizes that this is carried out for each traffic conflict. In a block 43 it is checked whether the space requirements 10 and 11, also referred to as conflict zones or conflict regions, still overlap one another. If this is not the case, the respective traffic conflict is deleted from the database in a block 44, whereupon the method moves to a block 45. However, if it is ascertained in a block 43 that the space requirements 10 and 11 still overlap one another, it is ascertained in a block 46 whether the vehicles involved in the respective traffic conflict are disposed close to one another, in particular in such a manner that a distance between the vehicles involved in a traffic conflict undershoots a pre-defined or pre-definable threshold value. If this is not the case, the method moves to a block 45. Otherwise, the method moves to a block 46 in which the corresponding traffic conflict is deleted from the database. In block 45 it is checked whether the last vehicle of the list has been checked. If this is not the case, the method moves to block 43. Otherwise, the method moves to a block 48. In block 48 it is identified which vehicle is no longer listed as a vehicle to be stopped or retained, i.e. for which vehicle there is no entry in the database with regard to a traffic conflict. Finally, in a block 49 all vehicles identified in block 48 are released, i.e. moved onward.

Figure 10:
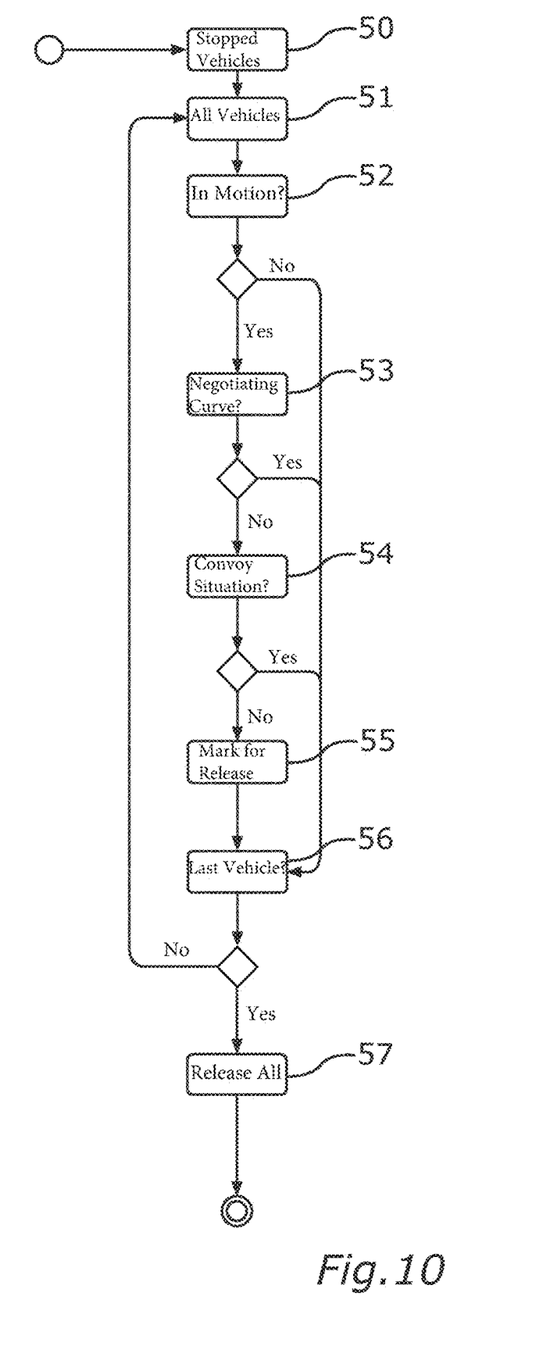
FIG. 10 shows a further flow chart for further visualizing the method.

Finally, FIG. 10 shows a further flowchart for further visualizing the method. In a block 50, the list already described in the context of block 41 is ascertained, and a block 51 visualizes that this is carried out for all vehicles. In a block 52 it is checked whether the respective vehicle of the list is still in motion. If this is not the case, it is ascertained in a block 53 whether the respective vehicle is negotiating a curve. If this is not the case, it is ascertained in a block 54 whether the respective vehicle is situated in a convoy situation in which the vehicle travels ahead of another vehicle and/or behind a yet again other vehicle, in particular in such a manner that the vehicles form a convoy. If this is not the case, the method moves to a block 55. If it is ascertained in block 52 that the respective vehicle is still in motion, if it is ascertained in block 53 that the vehicle is negotiating a curve, or if it is ascertained in block 54 that the vehicle is situated in a convoy situation, the method thus moves to a block 56 which also adjoins the block 55. In block 55 the respective vehicle is marked for release. Release is to be understood such that the vehicle which is released is again initiated to travel onward, in particular along its trajectory. In block 56 it is checked whether the last vehicle of the list has been checked. If this is not the case, the method moves to block 51. Otherwise, the method moves to a block 57. In a block 57 all vehicles are released and thus initiated to travel onward if, in the respective traffic conflict, all of the vehicles involved in the respective traffic conflict have been marked for release.

LIST OF REFERENCE SIGNS

1 Driverless transport vehicle
2 Driverless transport vehicle
3 Floor
4 Mobile electronic computing installation
5 Mobile electronic computing installation
6 Arrow
7 Arrow
8 Central electronic computing installation
9 Goods to be conveyed
10 Space requirement
11 Space requirement
12 Trajectory
13 Trajectory
14 Region
15 Region
16 Region
17 Block
18 Block
19 Block
20 Block
21 Block
22 Block
23 Block
24 Block
25 Block
26 Stopping region
27 Stopping region
28 Straight line
29 Straight line
30 Block
31 Block
32 Block
33 Block
34 Block
35 Block
36 Block
37 Block
38 Block
39 Block
40 Block
41 Block
42 Block
43 Block
44 Block
45 Block
46 Block
47 Block
48 Block
49 Block
50 Block
51 Block
52 Block
53 Block
54 Block
55 Block
56 Block
57 Block
58 Block
59 Block
60 Block
B Dimension
F Front
H Obstacle
R Rear

The invention claimed is:

1. A method for coordinating driverless transport vehicles, the method comprising:
   receiving, by a central electronic computing installation, a first trajectory of a first driverless transport vehicle of the driverless transport vehicles, which is computed by the first driverless transport vehicle;
   receiving, by the central electronic computing installation, a second trajectory of a second driverless transport vehicle of the driverless transport vehicles, which is computed by the second driverless transport vehicle;
   ascertaining, by the central electronic computing installation, a first space requirement of the first driverless transport vehicle along the first trajectory, and a second space requirement of the second driverless transport vehicle along the second trajectory; and
   in a case in which it is ascertained by the central electronic computing installation that the first and second space requirements at least partially overlap one another:
   selecting, by the central electronic computing installation, the first driverless transport vehicle or the second driverless transport vehicle, based on a criterion; and
   transmitting, by the central electronic computing installation, a signal to a selected driverless transport vehicle, wherein, based on the signal, the selected driverless transport vehicle is controlled to change its movement along its trajectory and/or to change its trajectory;
   wherein the signal controls the selected driverless transport vehicle to change its movement along its trajectory in such a manner that the selected driverless transport vehicle, initially traveling along the trajectory, stops;
   wherein, once the selected driverless transport vehicle has stopped and while the selected driverless transport vehicle is stopped, the other driverless transport vehicle travels along its trajectory; and
   wherein the selected driverless transport vehicle is instructed to end its stoppage and to travel onward based on a determination that the other driverless transport vehicle is negotiating a curve or is in a convoy with one or more other vehicles.

2. The method according to claim 1, wherein, when it is ascertained by the central electronic computing installation that the other driverless transport vehicle has travelled so far that any overlap of the first and second space requirements is precluded, the central electronic computing installation transmits to the selected driverless transport vehicle a further signal which controls the selected driverless transport vehicle to end its stoppage and to travel onward.

3. The method according to claim 1, wherein the criterion comprises a respective speed of the respective driverless transport vehicle that travels at the respective speed along its trajectory.

4. The method according to claim 1, wherein the criterion comprises that the first driverless transport vehicle or the second driverless transport vehicle travels forward or backward.

5. The method according to claim 1, wherein a point in which the first and second space requirements overlap one another is ascertained by the central electronic computing installation, wherein the criterion comprises a respective distance of the respective driverless transport vehicle from the point.

6. The method according to claim 5, wherein the first driverless transport vehicle or the second driverless transport vehicle is selected, based on which one is farther from the point.

7. The method according to claim 1, wherein the criterion comprises at least one of a plurality of potential, mutually dissimilar operating states of a respective driverless transport vehicle.

8. A system for carrying out a method according to claim 1.

* * * * *